No. 736,587. PATENTED AUG. 18, 1903.
G. S. DUNN & E. R. DOUGLAS.
SYSTEM OF ELECTRIC MOTOR CONTROL.
APPLICATION FILED JULY 2, 1903.
NO MODEL.
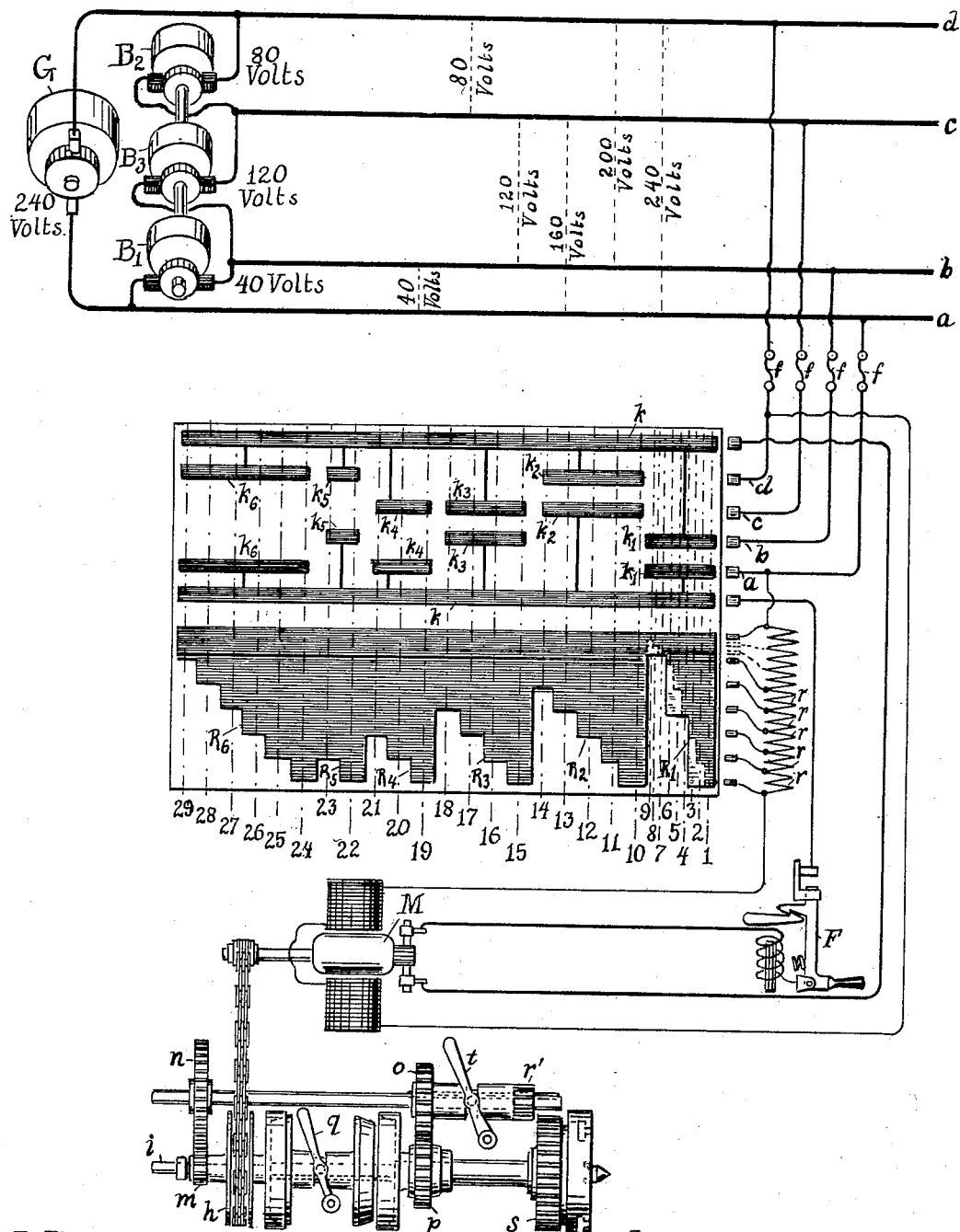
Witnesses:
Samuel W. Balch
Richard S. Harvey
Inventors,
Gano Sillick Dunn,
Edwin Rust Douglas
by Thomas Ewing, Jr.
Attorney.

No. 736,587.

Patented August 18, 1903.

UNITED STATES PATENT OFFICE.

GANO S. DUNN AND EDWIN RUST DOUGLAS, OF EAST ORANGE, NEW JERSEY, ASSIGNORS TO THE CROCKER-WHEELER COMPANY, OF AMPERE, NEW JERSEY, A CORPORATION OF NEW JERSEY.

SYSTEM OF ELECTRIC-MOTOR CONTROL.

SPECIFICATION forming part of Letters Patent No. 736,587, dated August 18, 1903.

Application filed July 2, 1903. Serial No. 164,034. (No model.)

*To all whom it may concern:*

Be it known that we, GANO SILLICK DUNN and EDWIN RUST DOUGLAS, citizens of the United States of America, and residents of East Orange, in the county of Essex and State of New Jersey, have invented certain new and useful Improvements in Systems of Electric-Motor Control, of which the following is a specification.

This invention relates to a system of motor control whereby the regulation of the motor is partly effected by shifting the motor connections between different pairs of conductors which are supplied with current and maintained at definite potentials and between which the potential differences—that is to say, the electrical pressures or voltages between each pair of conductors—are different. These required potential differences are preferably supplied from conductors forming a system of circuits which are interconnected by the sources which supply the current to the conductors or which maintain the potentials on the conductors, since current can then be supplied to a motor by connection of the terminals to any two of the conductors. If there are three such conductors, they can be paired in three different ways. If there are, for example, four such conductors, they can be paired in six different ways. Hence in a three-conductor system there can be three different arrangements of the connections of the two armature-terminals of a motor and the conductors, and in a four-conductor system there can be six different arrangements of the connections. If the potential difference between each two conductors in the series has a different value from the potential difference between any other two conductors, then as many different voltages can be supplied as there are combinations.

In bringing a motor from a condition of rest to its maximum speed the motor is successively connected, first, to the pair of conductors between which the potential difference is the least in value, and when the motor has speeded up and adjusted itself to the current supplied by the potential difference at this position the motor connections are shifted to the pair of conductors between which the potential difference has the next higher value, and so on, until the motor is connected to the pair of conductors between which the potential difference has the highest value, and it is then in the last position in the series of positions. In passing from each position or arrangement of connections to the next the additional voltage which is suddenly thrown on the motor causes a rush of current, which will be reduced to the normal current as soon as the motor can readjust itself to the higher voltage by increased speed or field strength. This rush of current is approximately proportional to the increase of the voltage. If excessive, it will cause injurious sparking at the commutator, and if it is too long sustained it will burn out the armature. With a given highest value of potential and a given number of successive positions or arrangements of connections, which are successively made before connecting the motor to the conductors with the highest potential difference, the additional voltage at each step will be the least possible if it is equal to the total voltage divided by the number of steps between the zero position and the final position. With this for the additional voltage at each successive position the series of voltages will be in arithmetical progression. This is important, since if the steps are unequal as to voltage the voltage increase at some of the steps will have to be larger and may be too large to be safe; but the percentage increase in the motor speed between successive voltage positions will not be the same, and for many purposes for which motor regulation is desirable—as, for example, in the individual drive of machine-tools—it is important that provision be made for a series of speeds in which the percentage difference between successive speeds should come within a given amount, usually about ten per cent., an amount which is less than the percentage difference of speed at any of the successive voltage positions and considerably less than the difference of speed between some of the successive voltage positions.

One object of the invention is, therefore, to combine with an arithmetical multiple-voltage system a secondary system of motor regulation that will give a series of motor speeds intermediate of the speeds at successive voltage positions, which intermediate speeds have a substantially uniform percentage difference between successive speeds. The whole series of speeds consequently approximate to a geometrical progression.

Another object of this invention is to provide suitable field regulation as the secondary system of motor regulation.

Another object of this invention is to arrange the controller for producing the requisite connections for the speed steps in consecutive order by movement of an operated part of the controller in one direction.

Reference will now be made to the accompanying sheet of drawings, which forms a part of this specification, wherein the figure shows diagrammatically a specific means of carrying out the invention.

The system illustrated includes four conductors, a source of supply, balancing devices by which the conductors are interconnected, a motor, a controller for effecting the requisite field connections and armature connections with the conductors, and a machine-tool with power-gearing for effecting changes in speed and power in excess of the working range of the electrical part of the system at full load.

There are four conductors $a$, $b$, $c$, and $d$, between which there is a continuous rise or fall of potential in the order named. Between the extreme conductors $a$ and $d$ a difference of potential of two hundred and forty volts is maintained by a generator G. The conductors $b$ and $c$ are maintained at intermediate potentials with respect to the extreme conductors by means of a balancer consisting of three mechanically-connected dynamo-electric machines $B'$, $B^2$, and $B^3$, which are so proportioned that they will maintain potential differences between their armature-terminals in the ratios of one, two, and three, respectively, when running together. These machines are connected in series between the extreme conductors in the order $B'$ $B^3$ $B^2$, and they will consequently subdivide the rise or fall of potential of two hundred and forty volts between the extreme conductors into the values forty volts, one hundred and twenty volts, and eighty volts between the intermediate conductors in the order named. These machines constituting the balancer act in part as motors and in part as generators to maintain the requisite potential differences between the conductors. The machines which act as generators and which act as motors will depend on the relative amounts of current drawn from the several conductors. By reason of the interconnections of the generator and machines of the balancer a circuit can always be traced from any one of two conductors which are being drawn upon to supply a motor through the main generator or through one or two of the machines of the balancer, which may be acting as generators, to the other conductor. The conductor $b$ is connected between the machines $B'$ and $B^3$, and the conductor $c$ is connected between the machines $B^3$ and $B^2$. Between the conductors $a$ and $b$ the machine $B'$, which is wound for forty volts, is connected and maintains a potential difference of forty volts, which is the unit potential difference of the system as illustrated. Between the conductors $c$ and $d$ the machine $B^2$, which is wound for eighty volts, is connected and maintains a potential difference of eighty volts, which is double the unit potential difference. Between the conductors $b$ and $c$ the machine $B^3$, which is wound for one hundred and twenty volts, is connected and maintains a potential difference of one hundred and twenty volts, which is three times the unit potential difference. Between the conductors $a$ and $c$ the machine $B'$, yielding forty volts, and the machine $B^3$, yielding one hundred and twenty volts, are in series and maintain a potential difference of one hundred and sixty volts. Between the conductors $b$ and $d$ the machine $B^3$, yielding one hundred and twenty volts, and the machine $B^2$, yielding eighty volts, are in series and maintain a potential difference of two hundred volts. Between the conductors $a$ and $d$ the main generator G maintains a potential difference of two hundred and forty volts. These six different voltages form an arithmetical progression, beginning with the common arithmetical difference of forty volts. They are therefore in the ratios of the numbers 1 2 3 4 5 6. The only arithmetical progression possible in an interconnected four-conductor system providing for six potential differences in series is with the voltages in the ratios of these numbers, with the third voltage of the series between the two intermediate conductors and the first and second voltages of the series each between one of the extreme conductors and one of the intermediate conductors when the conductors are arranged in the order of rising potential.

A controller is provided which by consecutive movements in one direction connects the armature of the motor M with the different pairs of the conductors in the order in which the pairs are enumerated above. For this purpose it has in sequence, first, a pair of contacts $k'$ $k'$, which connect the motor-terminals with the conductors $a$ and $b$; second, a pair of contacts $k^2$ $k^2$, which connect the motor-terminals with the conductors $c$ and $d$; third, a pair of contacts $k^3$ $k^3$, which connect the motor-terminals with the conductors $b$ and $c$; fourth, a pair of contacts $k^4$ $k^4$, which connect the motor-terminals with the conductors $a$ and $c$; fifth, a pair of contacts $k^5$ $k^5$, which connect the motor-terminals with the conductors $b$ and $d$, and, sixth, a pair of contacts $k^6$ $k^6$, which connect the motor terminals with the conductors $a$ and $d$.

The motor speeds at the various positions indicated are in approximately the same ratios as the voltages, and the maximum horse-power that the motor will safely generate at different voltages is also approximately proportional to the voltages. Machine-tools, such as lathes and boring-mills, with individual motor drives, for which this system of speed regulation has been mainly devised, require, on the other hand, about the same maximum horse-power at the various rotative speeds at which they have to run, since the variations in speed arise from the operation of the same tool at the same maximum cut, feed, and cutting speed, and therefore the performance of the same amount of work at different distances from the axis of the tool. The maximum torque varies inversely with the speed. Motors are rated at the power they will safely generate continuously at the maximum voltage (and speed) at which they are to be run. In a multiple-voltage system wherein the motor is run at several voltages and speeds and the same torque is required at each speed a motor with a rating greater than the required power must be used. This rating must be greater according as the working speed range of the driven machine at full load is greater. In consequence in order to avoid the employment of a very large motor only the higher voltages are usually included in the working range. In the case of a motor connected to a machine-tool the first voltage position or the first two or three voltage positions will be used only in starting, in setting up work, and for light cuts, and the remaining positions will comprise the working range. When slow rotative speeds corresponding to the lower voltage positions are necessary for taking heavy cuts at normal cutting speed, recourse will be had to a suitable mechanical speed-reduction gear, enabling the motor to be run at the higher voltage positions. Then some position other than the first of the series will be the lowest voltage position used for these heavy cuts.

The computation of the proportional speed, the counter electromotive force, and the drop in the armature due to the resistance of the armature and connections will now be discussed.

The following constants will enter into the computations: R equals resistance in armature and connections. $e$ equals voltage drop in armature and connections at rated full load. Let $n$ denote any voltage position, and $k$ the first voltage position in the working range. At any voltage position $n$ let $V_n$ equal impressed voltage, $E_n$ equal counter electromotive force, $C_n$ equal current, $P_n$ equal power, expressed in watts. The drop in the armature due to the armature resistance will be $V_n - E_n$. For voltage positions at or below $k$ the value of the drop $V_n - E_n$ may be taken as constant and equal to $e$. For voltage positions at or above $k$ the power P will be constant.

We have the following equations:

(1.) $C_n = \dfrac{V_n - E_n}{R}$, (2.) $C_n E_n = P_n$.

Solving these equations for $R P_n$ and $E_n$ gives the following values:

(3.) $R P_n = (V_n - E_n) E_n$.

(4.) $E_n = \dfrac{V_n}{2} \pm \sqrt{\dfrac{V_n^2}{4} - R P_n}$.

Suppose the current at position $k$ to be the largest current that the motor will take with safety. For this discussion that current may be taken as equal to the normal rated current at full voltage, or to $\overline{C}$. Since R is constant, we have at position $k$, $V_k - E_k = \overline{C} R$. In commercial motors of similar construction and speed and adapted for the same normal voltage the resistance drop at full load will be nearly the same, or $\overline{C} R = e$. This is practically a constant through a considerable range of sizes of motors of the same rated voltage. Therefore at position $k$, (5.) $\begin{cases} V_k - E_k = e, \\ E_k = V_k - e. \end{cases}$ For $n = k$ the equation 3 becomes $R P_k = (V_k - E_k) E_k$.

Substituting equation 5 in this $R P_k = e (V_k - e)$.

Since through the working range the power P required by the tool is constant, $P_n$ may be substituted for $P_k$, when $n \geq k$. Therefore for $n \geq k$, (6.) $R P_n = e (V_k - e)$.

Therefore equation 4 becomes for the positions $n \geq k$, (7.) $E_n = \dfrac{V_n}{2} + \sqrt{\dfrac{V_n^2}{4} - e(V_k - e)}$.

Only the positive value for the radical is retained, since the negative value pertains to a phase of action of dynamo-electric machinery that need not be considered.

The following detailed computations will be worked out on the basis of the third position being the lowest working position $k$ and that the drop $e$ in the armature and connections due to the maximum allowable current is eight volts. The power developed by the motor at position $k$ with maximum allowable current $\overline{C}$ will evidently be developed at any higher position with an armature-current approximately inversely proportional to the number of the position or to the motor speed. Also for positions below $k$ the maximum power obtainable with current $\overline{C}$ will be approximately directly proportional to the motor speed or number of the position. In these computations the motor will be assumed to develop the same horse-power at and above position $k$ and to draw current $C$ at and below position $k$. Drop $e$ will hence be the same at and below position $k$. It will not be much greater than this in practice, for if by misuse or accident an excessive load is put on the motor when connected to a low voltage, thereby increasing the drop and permitting an abnormal flow of current, the circuit will be opened either by the melting of one of the fuses $f$ or by operation of the circuit-breaker F. Then the counter electromotive force will be for the impressed voltages at the position $n \leq k$ $$E_1 = 40 - 8 = 32$$
$$E_2 = 80 - 8 = 72$$
$$E_3 = 120 - 8 = 112$$

Equation 7 gives the counter electromotive force for the impressed voltage at the positions $n > k$ $$E_4 = 154.2$$
$$E_5 = 195.4$$
$$E_6 = 236.2$$

The speed of the motor at position 6 will be regarded as the normal speed and denoted by unity. The speed of the motor at each voltage position is proportional to the counter electromotive force at the position. The speeds at all the voltage positions and the elements included in the calculation of the speeds are shown in the following table:

| Voltage position $n$. | Impressed voltage $V_n$. | Drop in armature $V_n - E_n$. | Counter E. M. F. $E_n$. | Proportional speed. |
|---|---|---|---|---|
| 1 | 40 | 8 | 32 | .135 |
| 2 | 80 | 8 | 72 | .305 |
| 3 | 120 | 8 | 112 | .474 |
| 4 | 160 | 5.8 | 154.2 | .652 |
| 5 | 200 | 4.6 | 195.4 | .827 |
| 6 | 240 | 3.8 | 236.2 | 1.000 |

These speeds are not close enough to each other to meet the usual machine-shop requirements for lathes and other rotary tools, and it is important to subdivide the voltage-speed steps by a series of speeds in steps of about ten per cent., so that successive steps have a ratio of about 1 to 1.10, as ordinarily desired for lathes and boring-mills. If the ratio is greater, the most economical cutting speed cannot always be approximated with sufficient accuracy. A much closer series of speeds, on the other hand, is not necessary, owing to the difficulty of accurately judging the speed at the cutting-tool. The speed regulation of the motor for these intermediate speeds is conveniently made by weakening the field of the motor. A given field has the effect of causing the same ratio of speed increase without regard to the voltage which is being supplied to the armature. From a comparison of the speeds at the successive voltage positions it will be seen that the greatest number of steps are required between the first and second voltage positions with a successively-decreasing number of steps between the succeeding positions in order to provide a series of speeds in the required ratio. We have found by trial that a series of speed increments with the fifth root of the ratio of speeds between positions 2 and 3 for a common ratio in addition to meeting the above conditions will give a whole number of subdivisions all in nearly uniform ratio between each of the consecutive speeds of the voltage positions. This series is represented by the following numbers: $r = 1.092$. $r^2 = 1.193$. $r^3 = 1.304$. $r^4 = 1.424$. $r^5 = 1.555$. $r^6 = 1.699$. $r^7 = 1.856$. $r^8 = 2.028$. If these speed increments are made by introducing resistances $r$ $r$ in the field-circuit, the same rheostat-sections and contact-fingers can be used in making the required speed changes between each of the voltage positions, but using a lesser number between the higher voltage positions. By combining with the contact-sections for the voltage connections the requisite stepped contact-sections $R_1$ to $R_6$ for the operation of the rheostat, so that they will operate together in proper sequence, and adding additional steps above the sixth voltage position a series of graduated speeds in substantially geometrical progression can be obtained by consecutive movements of the controller in the same direction, and these will be as in the following table:

| Controller position. | Voltage position. | Speed increase by field regulation. | Regulating speed. |
|---|---|---|---|
| 1 | 1 |  | .135 |
| 2 | 1 | .092 | .148 |
| 3 | 1 | .193 | .162 |
| 4 | 1 | .304 | .177 |
| 5 | 1 | .424 | .193 |
| 6 | 1 | .555 | .211 |
| 7 | 1 | .699 | .230 |
| 8 | 1 | .856 | .251 |
| 9 | 1 | 1.028 | .275 |
| 10 | 2 |  | .305 |
| 11 | 2 | .092 | .333 |
| 12 | 2 | .193 | .364 |
| 13 | 2 | .304 | .398 |
| 14 | 2 | .424 | .434 |
| 15 | 3 |  | .474 |
| 16 | 3 | .092 | .518 |
| 17 | 3 | .193 | .566 |
| 18 | 3 | .304 | .618 |
| 19 | 4 |  | .652 |
| 20 | 4 | .092 | .714 |
| 21 | 4 | .193 | .779 |
| 22 | 5 |  | .827 |
| 23 | 5 | .092 | .904 |
| 24 | 6 |  | 1. |
| 25 | 6 | .092 | 1.092 |
| 26 | 6 | .193 | 1.193 |
| 27 | 6 | .304 | 1.304 |
| 28 | 6 | .424 | 1.424 |
| 29 | 6 | .555 | 1.555 |
| 30 | 6 | .699 | 1.699 |

Since the speeds following the first voltage position are not within the working range of the system, owing to the small power which the motor can safely develop, it is not important that they should be so close together, and in the actual construction of controllers I prefer to omit the second and third, fifth and sixth, and eighth and ninth controller positions, as illustrated by the full-line steps of the contact-section $R_1$. If it be desired to include these speed positions, the steps shown in dotted lines should be followed instead and two additional contact-fingers added. The amount of resistance which should be inserted in the field-circuit at each step in order to produce the speed variations above calculated is best ascertained by experiment, since the amount required is not readily calculated and depends on the law of magnetic flux, as well as upon Ohm's law. In practice it has been found that the sections of resistance should all be of about the same value in order to produce speed variations in geometrical progression.

The lower limit of the working range was taken at voltage position 3 in making the foregoing computation. This is controller position 15. The upper limit under these circumstances would be at controller position 28, making a working range of three to one. If a larger motor be employed, the working range may be extended from voltage position 2, which is controller position 10, to controller position 30. This will give a working range of 5.57 to 1. On the other hand, if a more limited range only is needed the working range may be restricted between voltage position 4, which is controller position 19, and controller position 27. This will give a working range of two to one. The total controller-range is 12.5 to 1.

Lathes and many other tools require in taking heavy cuts a much greater range of speed for the main spindle than is included in the working range of the motor, and the electrical system should therefore be supplemented by a gear system which affords two additional speeds to be combined with the controller speeds. For this purpose the diagram illustrates an arrangement of back-gearing. The motor drives the pulley $h$, which is loose on the main spindle $i$ of the machine-tool and is connected with a pinion $m$, in mesh with a gear $n$ on the back-gear shaft $l$. These gears have a speed ratio of 3.3 to 1. A gear $o$ on the back-gear shaft engages an equal gear $p$, which is loose on the main spindle. The speed ratio of the train of gears $m$ and $n$, $o$ and $p$ is therefore also 3.3 to 1. This is equal to a range amounting to one controller step more than the working range of the motor. A double clutch $q$ engages either the pulley $h$ with the spindle or the gear $p$ with the spindle, and the main spindle can consequently be driven either at the same speed as the pulley $h$ or at a lower speed in the ratio of 3.3 to 1. Hence the spindle speeds given with direct driving, but with reduced power, by controller positions from 14 to 1, inclusive, are duplicated at greater power when driving through the back-gearing from controller positions 28 to 15, inclusive. The back-gear shaft also carries a pinion $r$, which can be thrown into engagement with the gear $s$ on the head of the spindle, and the gear $o$ thrown out of engagement at the same time by operating a lever $t$. The pinion and the gear $s$ are also in the ratio of 3.3 to 1. Hence by opening the clutch $q$, and thereby disconnecting the spindle from both the pulley $h$ and the gear $p$ and engaging the back-shaft pinion $r$ with the gear $s$ still lower spindle speeds are obtained in the ratio of 3.3 to 1 as compared with the preceding back-gear connections, and the working range will be again extended by this ratio. The combined electrical and mechanical speed-changing instrumentalities will give a working-speed range equal to the product of the two mechanical ratios and the working range of the motor. This will be $$3.3 \times 3.3 \times 3.0 = 32.7.$$

The total range of the system will be the product of the two mechanical ratios and the total range of the motor. This will be $$3.3 \times 3.3 \times 12.5 = 136.1.$$

The voltage positions may be subdivided more or less closely by other geometrical ratios than the one above illustrated in detail. Another ratio by which the voltage-speed steps may be subdivided is a ratio of $1:1.15$. This will give fewer subdivisions between the voltage speeds.

What we claim as new, and desire to secure by Letters Patent of the United States, is—

1. In a multiple-voltage system of motor control, the combination of a plurality of conductors, sources of supply for maintaining different potential differences between different pairs of conductors, such that the values of the potential differences between different pairs of conductors can be arranged in an arithmetical progression, a motor, and means for changing the connections of the motor and the conductors so as to throw upon the motor the different potential differences in the order of their arithmetical progression, in combination with means for producing a series of motor speeds in the same ratios with each arrangement of connections of the motor and the conductors but in successively decreasing number with each successively increasing potential difference, whereby the entire series of connections will produce a series of speeds which approximate to a geometrical progression, substantially as described.

2. In a multiple-voltage system of motor control, the combination of a plurality of conductors, sources of supply for maintaining different potential differences between different pairs of conductors such that the value of the potential differences between different pairs of conductors can be arranged in an arithmetical progression, a motor, and means for changing the connections of the motor-armature and the conductors so as to throw upon the motor the different potential differences in the order of their arithmetical progression, in combination with means for producing a series of motor speeds by field variation in the same ratios with each arrangement of the motor-armature and the conductors, but in successively decreasing number with each successively increasing potential difference, whereby the entire series of connections will produce a series of speeds which approximate to a geometrical progression, substantially as described.

3. In a multiple-voltage system of motor control, the combination of a plurality of conductors, sources of supply for maintaining different potential differences between different pairs of conductors, such that the values of the potential differences between different pairs of conductors can be arranged in an arithmetical progression, a motor, and means for changing the connections of the motor-armature and the conductors so as to throw upon the motor the different potential differences in the order of their arithmetical progression, in combination with means for producing a series of motor speeds in the same geometrical progression with each arrangement of connections of the motor-armature and the conductors, whereby the entire series of connections will produce a series of speeds in substantially geometrical progression, substantially as described.

Signed by us at Ampere, East Orange, Essex county, New Jersey, this 30th day of June, 1903.

GANO S. DUNN.
EDWIN RUST DOUGLAS.

Witnesses:
S. N. THOMAS,
J. FOX.